United States Patent
Seo et al.

(10) Patent No.: US 9,680,622 B2
(45) Date of Patent: *Jun. 13, 2017

(54) METHOD AND APPARATUS FOR TRANSMITTING RECEPTION CONFIRMATION IN WIRELESS SYSTEM

(71) Applicant: LG ELECTRONICS INC., Seoul (KR)

(72) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,331

(22) Filed: Jun. 13, 2016

(65) Prior Publication Data

US 2016/0301510 A1 Oct. 13, 2016

Related U.S. Application Data

(63) Continuation of application No. 14/522,829, filed on Nov. 25, 2014, now Pat. No. 9,385,851, which is a
(Continued)

(51) Int. Cl.
*H04J 3/24* (2006.01)
*H04L 5/00* (2006.01)
(Continued)

(52) U.S. Cl.
CPC ......... *H04L 5/0055* (2013.01); *H04B 7/2643* (2013.01); *H04L 1/1614* (2013.01);
(Continued)

(58) Field of Classification Search
CPC ..... H04W 80/04; H04W 84/12; H04W 88/06; H04W 88/08; H04W 84/18; H04W 36/30; H04W 36/24; H04W 74/08; H04W 8/26
(Continued)

(56) References Cited

U.S. PATENT DOCUMENTS 8,300,585 B2 10/2012 Xu et al.
8,537,853 B2 9/2013 Falahati et al.
(Continued)

FOREIGN PATENT DOCUMENTS

CN 101227233 7/2008
CN 101473583 7/2009
(Continued)

OTHER PUBLICATIONS

U.S. Appl. No. 14/552,829, Office Action dated Dec. 7, 2015, 19 pages.
(Continued)

*Primary Examiner* — Brenda H Pham
(74) *Attorney, Agent, or Firm* — Lee, Hong, Degerman, Kang & Waimey

(57) ABSTRACT

Provided are a method and an apparatus for transmitting a reception confirmation in a wireless system. A terminal determines at least one downlink sub-frame for ACK/NACK feedback from each of a plurality of serving cells and determines the number of ACK/NACK bits for the plurality of serving cells. The terminal generates bundled ACK/NACK bits by arraying the ACK/NACK bits in the ascending order of the cell index of the plurality of serving cells, and transmits the bundled ACK/NACK bits.

19 Claims, 11 Drawing Sheets

Related U.S. Application Data continuation of application No. 13/824,514, filed as application No. PCT/KR2011/007115 on Sep. 28, 2011, now Pat. No. 8,923,273.

(60) Provisional application No. 61/387,459, filed on Sep. 28, 2010.

(51) Int. Cl.

| H04L 1/16 | (2006.01) |
|---|---|
| H04W 24/02 | (2009.01) |
| H04L 1/18 | (2006.01) |
| H04B 7/26 | (2006.01) |
| H04L 5/14 | (2006.01) |
| H04L 27/36 | (2006.01) |

(52) U.S. Cl.
CPC .......... *H04L 1/1692* (2013.01); *H04L 1/1861* (2013.01); *H04L 5/14* (2013.01); *H04L 27/361* (2013.01); *H04W 24/02* (2013.01)

(58) Field of Classification Search
USPC ................................ 370/328, 332, 338, 349
See application file for complete search history.

(56) References Cited

U.S. PATENT DOCUMENTS

| 8,923,273 B2* | 12/2014 | Seo ....................... H04L 1/1614 370/248 |
|---|---|---|
| 9,385,851 B2* | 7/2016 | Seo ....................... H04L 1/1614 |
| 2009/0303956 A1 | 12/2009 | Chen et al. |
| 2010/0205499 A1 | 8/2010 | Axelsson et al. |
| 2010/0210256 A1 | 8/2010 | Shen et al. |
| 2011/0283157 A1 | 11/2011 | Yang et al. |
| 2012/0106491 A1* | 5/2012 | Yang .................... H04L 1/0073 370/329 |
| 2012/0182914 A1 | 7/2012 | Hariharan et al. |

FOREIGN PATENT DOCUMENTS

| CN | 101689984 | 3/2010 |
|---|---|---|
| JP | 2010527567 A | 8/2010 |
| WO | 2012149456 A1 | 11/2012 |

OTHER PUBLICATIONS

Huawei, "A/N Codebook Design for Carrier Aggregation using Format 2 and DFT-S-OFDM," 3GPP TSG RAN WG1 meeting #61bis, R1-103886, Jun. 2010, 4 pages.

LG Electronics, "Di4 scussion on ACK/NACK transmission for TDD in LTE-A," 3GPP TSG RAN WG1 #62, R1-104640, Aug. 2010, 4 pages.

Korean Intellectual Property Office Application Serial No. 10-2013-7006256, Office Action dated Jun. 26, 2014, 4 pages.

LG Electronics, "Discussion on ACK/NACK transmission for TDD in LTE-A," 3GPP TSG RAN WG1 #62, R1-104640, Aug. 2010, 4 pages.

The State Intellectual Property Office of the People's Republic of China Application Serial No. 201180046373.7, Office Action dated Nov. 15, 2014, 6 pages.

Huawei, et al., "Remaining details on PUCCH format 3 for LTE-A TDD," 3GPP TSG RAN WG1 meeting #63, R1-105831, Nov. 2010, 5 pages.

Huawei, et al., "Ordering and segmentation of HARQ-ACK bits for TDD," 3GPP TSG RAN WG1 meeting #63bis, R1-110553, Jan. 2011, 5 pages.

Qualcomm Incorporated, "Introduction of Rel-10 LTE-Advanced features in 36.212," 3GPP TSG-RAN Meeting #62, R1-105097, Aug. 2010, 93 pages.

Japan Patent Office Application Serial No. 2014-217276, Office Action dated Oct. 20, 2015, 5 pages.

Huawei, "A/N Codebook Design for Carrier Aggregation using Format 2 and DFT-S-OFDM," R1-103886, 3GPP TSG RAN WG1 Meeting #61bis, Jun. 2010, 4 pages.

LG Electronics, "Discussion on ACK/NACK transmission for TDD in LTE-A," R1-104640, 3GPP TSG RAN WG1 #62, Aug. 2010, 4 pages.

LG Electronics, "Details on DFT-S-OFDM format for CA PUCCH," R1-104757, 3GPP TSG RAN WG1 #62, Aug. 2010, 4 pages.

Samsung, "Discussion on ACK/NACK bundling method for LTE-A TDD," R1-104579, 3GPP TSG RAN WG1 meeting #62, Aug. 2010, 6 pages.

* cited by examiner

METHOD AND APPARATUS FOR TRANSMITTING RECEPTION CONFIRMATION IN WIRELESS SYSTEM

CROSS-REFERENCE TO RELATED APPLICATIONS

This application is a continuation of U.S. patent application Ser. No. 14/552,829, filed on Nov. 25, 2014, now U.S. Pat. No. 9,385,851, which is a continuation of U.S. patent application Ser. No. 13/824,514, filed on Mar. 18, 2013, now U.S. Pat. No. 8,923,273, which is the National Stage filing under 35 U.S.C. 371 of International Application No. PCT/KR2011/007115, filed on Sep. 28, 2011, which claims the benefit of U.S. Provisional Application No. 61/387,459, filed on Sep. 28, 2010, the contents of all of which are hereby incorporated by reference herein in their entireties.

TECHNICAL FIELD

The present invention relates to wireless communications, and more particularly, to a method and apparatus for transmitting a reception acknowledgement for hybrid automatic repeat request (HARQ) in a wireless communication system.

BACKGROUND OF THE INVENTION

Long term evolution (LTE) based on 3rd generation partnership project (3GPP) technical specification (TS) release 8 is a promising next-generation mobile communication standard.

As disclosed in 3GPP TS 36.211 V8.7.0 (2009 May) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is an uplink control channel used for transmission of an uplink control signal such as a hybrid automatic repeat request (HARQ) positive-acknowledgement (ACK)/negative-acknowledgement (NACK) signal, a channel quality indicator (CQI), and a scheduling request (SR).

Meanwhile, 3GPP LTE-advanced (A) which is an evolution of 3GPP LTE is under development. Examples of techniques employed in the 3GPP LTE-A include carrier aggregation and multiple input multiple output (MIMO) supporting four or more antenna ports.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells.

In a multiple carrier system, a user equipment (UE) does not always receive a service from a plurality of serving cells. The serving cell may be added or deleted according to a service situation. With a change in the number of serving cells, a configuration of a serving cell may be mismatched between the UE and a base station (BS).

An HARQ error is one of problems which occur when the configuration of the serving cell is mismatched. For example, the UE sends HARQ ACK/NACK for one serving cell, but the BS expects HARQ ACK/NACK for a plurality of serving cell. The HARQ error may cause a data loss or a service delay.

Accordingly, there is a need for a method of reducing an HARQ error in a multiple carrier system using a plurality of serving cells.

SUMMARY OF THE INVENTION

The present invention provides a method and apparatus for transmitting a reception acknowledgement to reduce a hybrid automatic repeat request (HARQ) error in a time division duplex (TDD)-based wireless communication system.

In an aspect, a method of transmitting a reception acknowledgement in a wireless communication system is provided. The method includes determining, by a user equipment (UE), a number of ACK/NACK bits for a plurality of serving cells and at least one downlink subframe for which the UE needs to feedback ACK/NACK in each of the plurality of serving cells, generating, by the UE, combined ACK/NACK bits by arranging the ACK/NACK bits in ascending order of cell indexes of the plurality of serving cells, generating, by the UE, encoded ACK/NACK bits by encoding the combined ACK/NACK bits, generating, by the UE, ACK/NACK symbols by modulating the encoded ACK/NACK bits, and transmitting, by the UE, the ACK/NACK symbols to a base station.

The step of generating the combined ACK/NACK bits may include generating the combined ACK/NACK bits by arranging ACK/NACK bits for a first serving cell having a lowest cell index, and appending ACK/NACK bits for a second serving cell having a cell index next to the lowest cell index at the end of the combined ACK/NACK bits.

The method may further include determining whether the number of ACK/NACK bits is greater than a specific value.

If the number of ACK/NACK bits is greater than the specific value, spatial bundling in which a binary AND operation of ACK/NACK bits corresponding to at least two codewords in each subframe is performed may be applied to all subframes in all serving cell.

In another aspect, a user equipment configured for transmitting a reception acknowledgement in a wireless communication system is provided. The user equipment includes a radio frequency unit configured for transmitting a radio signal, and a processor operatively coupled with the radio frequency unit. The processor is configured to determine a number of ACK/NACK bits for a plurality of serving cells and at least one downlink subframe for which the user equipment needs to feedback ACK/NACK in each of the plurality of serving cells, generate combined ACK/NACK bits by arranging the ACK/NACK bits in ascending order of cell indexes of the plurality of serving cells, generate encoded ACK/NACK bits by encoding the combined ACK/NACK bits, generate ACK/NACK symbols by modulating the encoded ACK/NACK bits, and transmit the ACK/NACK symbols to a base station.

A method of transmitting a reception acknowledgement in a time division duplex (TDD) system having a plurality of serving cells is provided. A hybrid automatic repeat request (HARQ) error can be decreased even if a cell configuration is mismatched between a base station and a user equipment.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
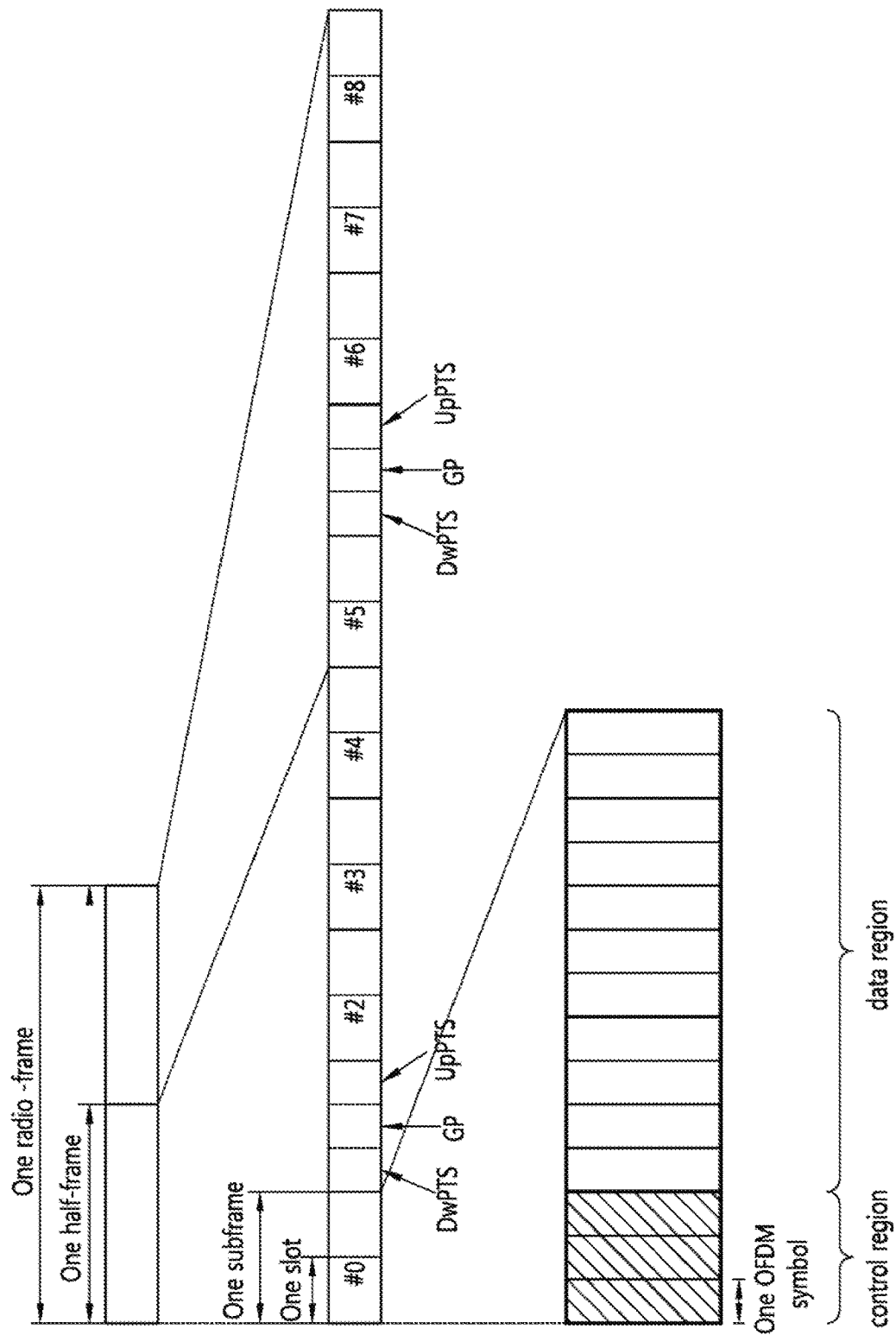
FIG. 1 shows a downlink radio frame structure in 3rd generation partnership project (3GPP) long term evolution (LTE).

FIG. 1 shows a downlink radio frame structure in 3rd generation partnership project (3GPP) long term evolution (LTE). The section 4 of 3GPP TS 36.211 V8.7.0 (2009 May) "Evolved Universal Terrestrial Radio Access (E-UTRA); Physical Channels and Modulation (Release 8)" may be incorporated herein by reference for time division duplex (TDD).

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe coexist in one radio frame. Table 1 shows an example of a configuration of the radio frame.

TABLE 1

| UL-DL Con-figuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a 1st slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/ negative-acknowledgement (NACK) signal for uplink hybrid automatic repeat request (HARQ). The ACK/NACK signal for uplink (UL) data on a PUSCH transmitted by the UE is transmitted on the PHICH.

A physical broadcast channel (PBCH) is transmitted in four preceding OFDM symbols in a 2nd slot of a 1st subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
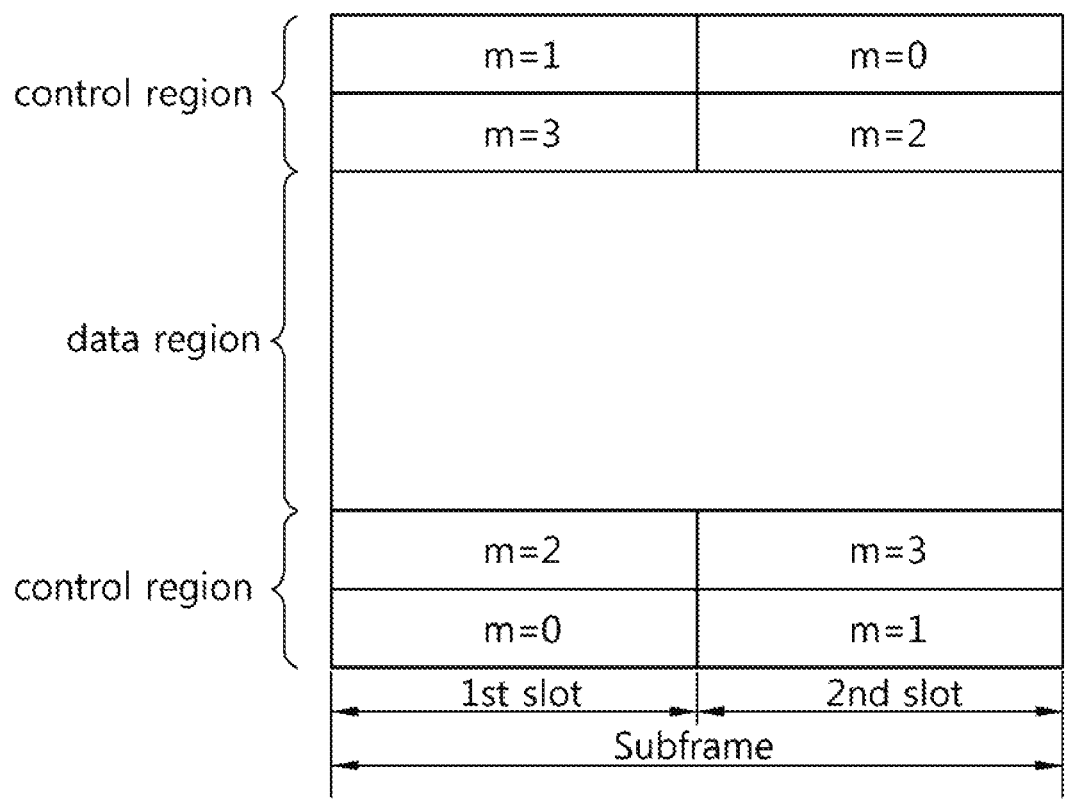
FIG. 2 shows an example of an uplink subframe in 3GPP LTE.
Figure 2:
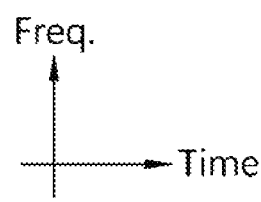

FIG. 2 shows an example of a UL subframe in 3GPP LTE.

The UL subframe can be divided into a control region and a data region. The control region is a region to which a physical uplink control channel (PUCCH) carrying UL control information is assigned. The data region is a region to which a physical uplink shared channel (PUSCH) carrying user data is assigned.

The PUCCH is allocated in an RB pair in a subframe. RBs belonging to the RB pair occupy different subcarriers in each of a 1st slot and a 2nd slot. m is a location index indicating a logical frequency-domain location of the RB pair allocated to the PUCCH in the subframe. It shows that RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format. The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence ru(n) is defined by Equation 1 below.

$$r_u(n) = e^{jb(n)\pi/4} \quad \text{[Equation 1]}$$

In Equation 1, u denotes a root index, and n denotes a component index in the range of $0 \le n \le N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence r(n, Ics).

$$r(n, I_{cs}) = r(n) \cdot \exp\left(\frac{j2\pi I_{cs} n}{N}\right), \quad 0 \le I_{cs} \le N-1 \quad \text{[Equation 2]}$$

In Equation 2, Ics denotes a CS index indicating a CS amount ($0 \le I_{cs} \le N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

In the PUCCH formats 1/1a/1b, the PUCCH is configured by additionally using an orthogonal sequence index and a resource block index in addition to the CS index. That is, an orthogonal sequence index, a CS index, and a resource block index are parameters required to configure the PUCCH, and are also resources used to identify the PUCCH (or UE).

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) can be expressed with at least any one of an orthogonal sequence index, a CS index, a resource block index, and an index for obtaining the 3 indices. The ACK/NACK resource may include at least one of an orthogonal sequence, a cyclic shift, a resource block, and a combination thereof.

In the 3GPP LTE, a resource index n(1)PUUCH is defined so that the UE obtains the three parameters for configuring the PUCCH. The resource index n(1)PUUCH is defined as nCCE+N(1)PUUCH, where nCCE is an index of a first CCE used for transmission of corresponding DCI (i.e., DL resource allocation used to receive DL data mapped to an ACK/NACK signal), and N(1)PUUCH is a parameter reported by a BS to the UE by using a higher-layer message.

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or bandwidth aggregation, also referred to as carrier aggregation) supports a plurality of CCs. For example, if 5 CCs are assigned as a granularity of a carrier unit having a bandwidth of 20 MHz, a bandwidth of up to 100 MHz can be supported.

A CC or a CC-pair can be mapped to one cell. When a synchronization signal and a PBCH are transmitted in each CC, it can be said that one DL CC is mapped to one cell. Therefore, when a UE communicates with a BS through a plurality of CCs, it can be said that the UE receives a service from a plurality of serving cells.

Figure 3:
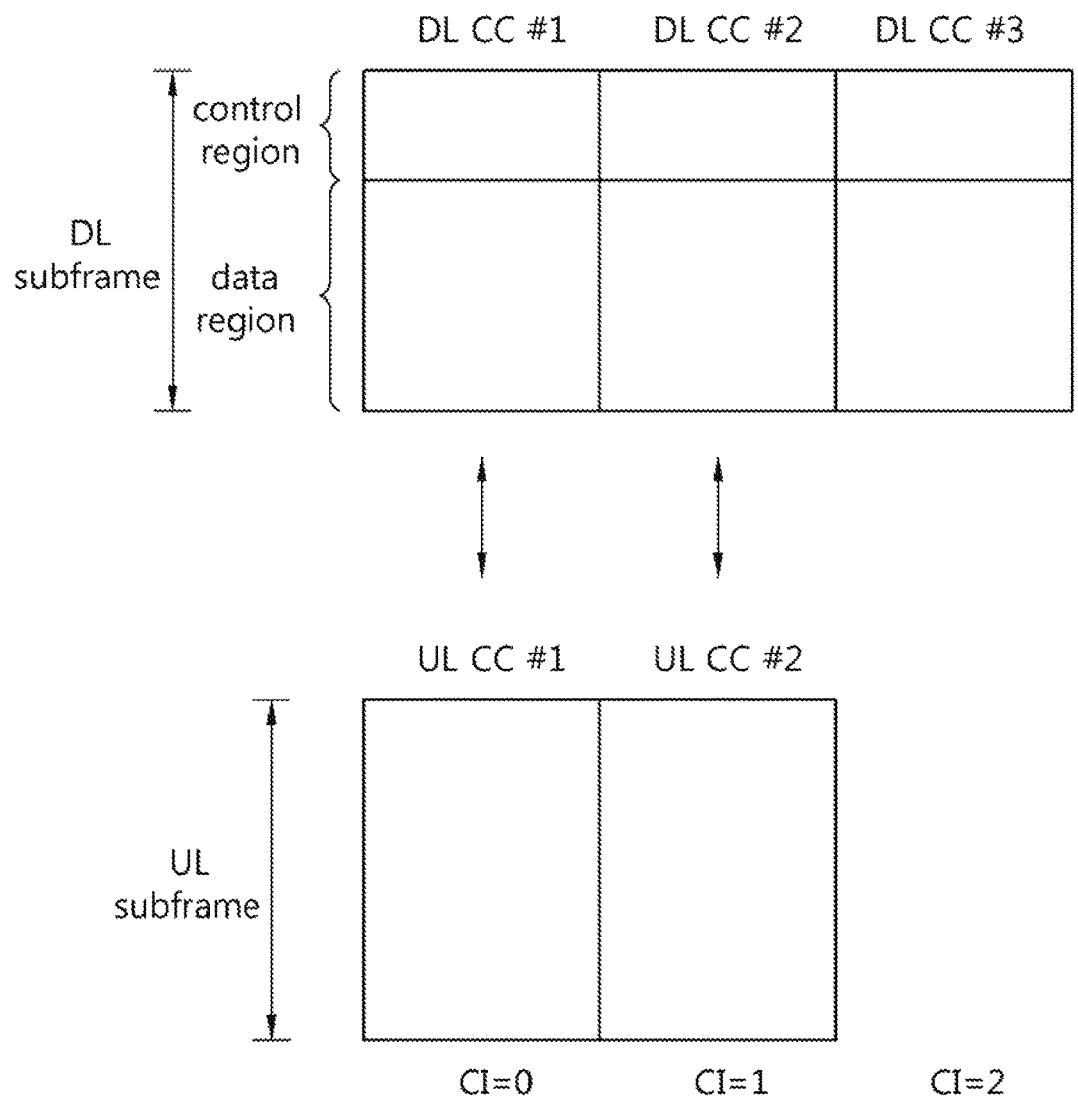
FIG. 3 shows an example of multiple carriers.

FIG. 3 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CCs. The UE can transmit a plurality of UL transport blocks simultaneously via a plurality of UL CCs.

It is assumed that a pair of a DL CC #1 and a UL CC #1 is a 1st serving cell, a pair of a DL CC #2 and a UL CC #2 is a 2nd serving cell, and a DL CC #3 is a 3rd serving cell. Each serving cell can be identified by using a cell index (CI). The CI may be cell-specific or UE-specific. Herein, CI=0, 1, 2 are assigned to the 1st to 3rd serving cells for example.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

Now, ACK/NACK transmission for HARQ in 3GPP LTE time division duplex (TDD) will be described.

A UL subframe and a DL subframe coexist in one radio frame in the TDD, unlike in frequency division duplex (FDD). In general, the number of UL subframes is less than the number of DL subframes. Therefore, in preparation for a case in which the UL subframes for transmitting an ACK/NACK signal are insufficient, it is supported that a plurality of ACK/NACK signals for a plurality of DL transport blocks are transmitted in one UL subframe.

According to the section 10.1 of 3GPP TS 36.213 V8.7.0 (2009 May), two ACK/NACK modes, i.e., channel selection and bundling, are introduced.

First, the bundling is an operation in which, if all of PDSCHs (i.e., DL transport blocks) received by a UE are successfully decoded, ACK is transmitted, and otherwise NACK is transmitted. This is called an AND operation.

However, the bundling is not limited to the AND operation, and may include various operations for compressing ACK/NACK bits corresponding to a plurality of transport blocks (or codewords). For example, the bundling may indicate a count indicating the number of ACKs (or NACKs) or the number of consecutive ACKs.

Second, the channel selection is also called ACK/NACK multiplexing. The UE transmits the ACK/NACK by selecting one of a plurality of PUCCH resources.

Table 2 below shows a DL subframe n-k associated with a UL subframe n depending on the UL-DL configuration in 3GPP LTE. Herein, k∈K, where M is the number of elements of a set K.

TABLE 2

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Assume that M DL subframes are associated with a UL subframe n, where M=3.

Since three PDCCHs can be received from three UL subframes, the UE can acquire three PUCCH resources n(1)PUCCH,0, n(1)PUCCH,1, and n(1)PUCCH,2. An example of channel selection is shown in Table 3 below.

TABLE 3

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

HARQ-ACK(i) denotes ACK/NACK for an ith DL subframe among the M DL subframes. Discontinuous transmission (DTX) implies that a DL transport block cannot be received on a PDSCH in a corresponding DL subframe or a corresponding PDCCH cannot be detected. In Table 3 above, there are three PUCCH resources n(1)PUCCH,0, n(1)PUCCH,1, and n(1)PUCCH,2, and b(0) and b(1) are 2 bits transmitted by using a selected PUCCH.

For example, if the UE successfully receives three DL transport blocks in three DL subframes, the UE transmits bits (1,1) through the PUCCH by using n(1)PUCCH,2. If the UE fails to decode the DL transport block and successfully decodes the remaining transport blocks in a 1st (i=0) DL subframe, the UE transmits bits (0, 1) through the PUCCH by using n(1)PUCCH,2.

In channel selection, NACK and DTX are coupled if at least one ACK exists. This is because a combination of a reserved PUCCH resource and a QPSK symbol is not enough to express all ACK/NACK states. However, if the ACK does not exist, the DTX and the NACK are decoupled.

The conventional PUCCH format 1b can transmit only 2-bit ACK/NACK. However, channel selection is used to express more ACK/NACK states by linking the allocated PUCCH resources and an actual ACK/NACK signal.

Meanwhile, if it is assumed that M DL subframes are associated with a UL subframe n, an error may occur in an ACK/NACK signal due to missing of the DL subframe. Assume that M=3, and the BS transmits three DL transport blocks through three DL subframes. The UE misses the PDCCH in the 2nd DL subframe and thus cannot receive a 2nd transport block at all, and can receive only the remaining 1st and 3rd transport blocks. In this case, if bundling is used, the UE erroneously transmits ACK.

In order to solve this error, a downlink assignment index (DAI) is included in a DL grant on the PDCCH. The DAI includes a counter value which is sequential to associated M DL subframes.

Figure 4A:
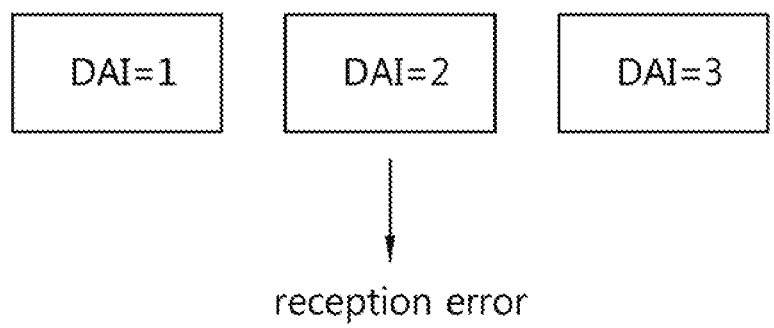
FIGS. 4a and 4b show examples of error detection using a downlink assignment index (DAI).
Figure 4B:
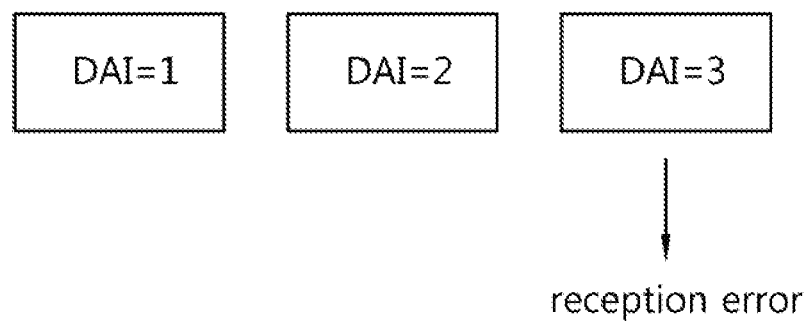

FIGS. 4a and 4b show examples of error detection using a DAI.

In FIG. 4a, a UE misses a 2nd DL subframe, and thus cannot receive DAI=2. In this case, the UE receives DAI=3, and thus can know missing of a DL subframe corresponding to DAI=2.

In FIG. 4b, the UE misses a 3rd DL subframe, and thus cannot receive DAI=3. In this case, the UE cannot know missing of the 3rd DL subframe. However, in 3GPP LTE, a PUCCH is configured on the basis of a 1st CCE of a last received PDCCH so that a BS can know missing of the DL subframe. That is, the UE transmits ACK/NACK by using a PUCCH resource based on a PUCCH resource of a DL subframe corresponding to DAI=2. The BS can know the missing of the 3rd DL subframe since the ACK/NACK is received by using the PUCCH resource corresponding to the DL subframe with DAI=2 rather than the DL subframe with DAI=3.

Meanwhile, with the use of a plurality of serving cells, an additional PUCCH format 3 is under discussion in addition to the PUCCH format of the conventional 3GPP LTE, in preparation for a case in which the number of ACK/NACK bits is insufficient.

Figure 5:
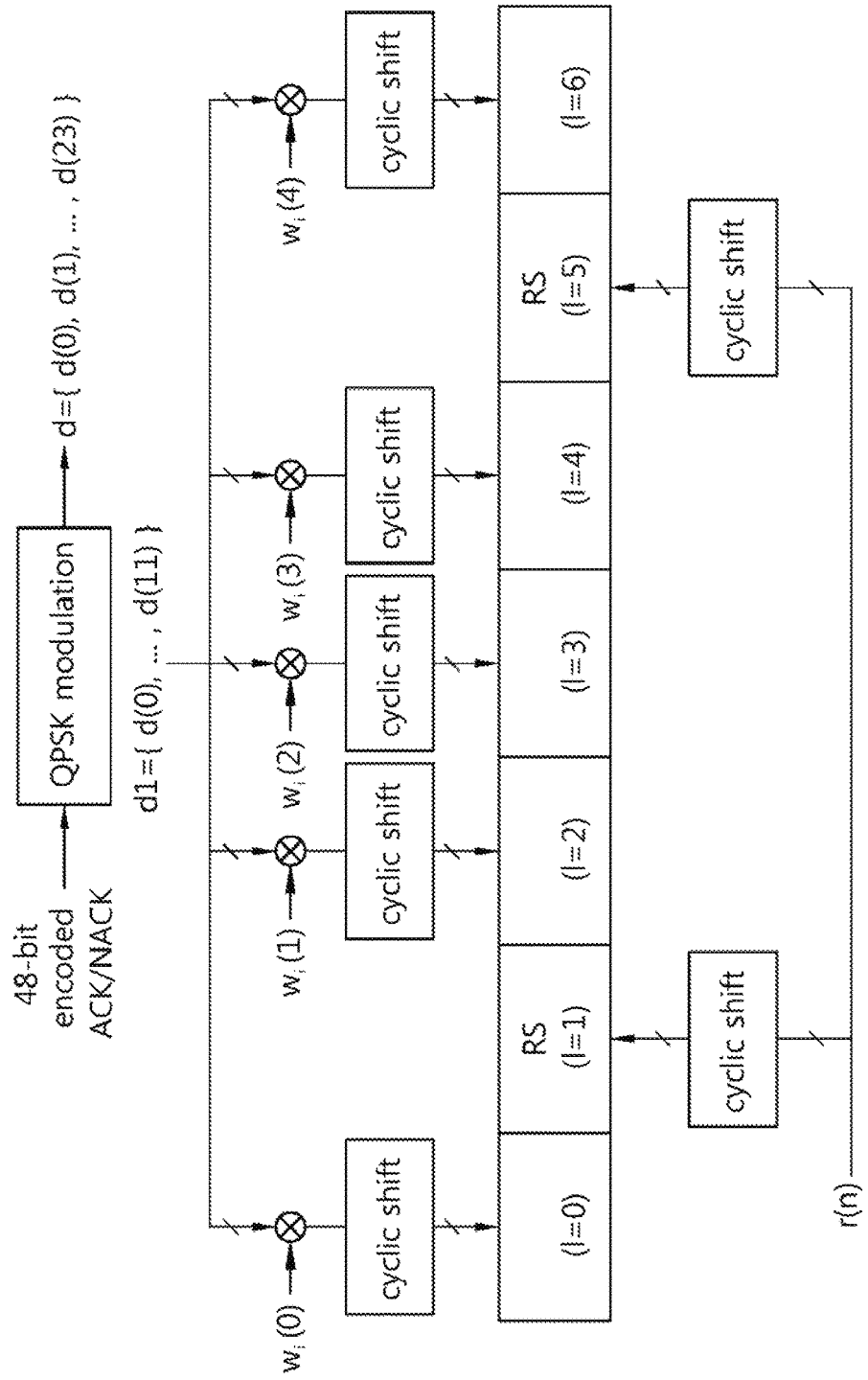
FIG. 5 shows an example of a structure of a physical uplink control channel (PUCCH) format 3 in a normal cyclic prefix (CP) case.

FIG. 5 shows an example of a structure of a PUCCH format 3 in a normal CP case.

One slot includes 7 OFDM symbols. I denotes an OFDM symbol number in the slot, and has a value in the range of 0 to 6. Two OFDM symbols with I=1, 5 are used as RS OFDM symbols for a reference signal, and the remaining OFDM symbols are used as data OFDM symbols for an ACK/NACK signal.

A symbol sequence d={d(0), d(1), . . . , d(23)} is generated by performing QPSK modulation on a 48-bit encoded ACK/NACK signal. d(n) (n=0, 1, . . . , 23) is a complex-valued modulation symbol. The symbol sequence d can be regarded as a set of modulation symbols. The number of bits of the ACK/NACK signal or a modulation scheme is for exemplary purposes only, and thus the present invention is not limited thereto.

One PUCCH uses one RB, and one subframe includes a first slot and a second slot. A symbol sequence d={d(0), d(1), . . . , d(23)} is divided into two sequences d1={d(0), . . . , d(11)} and d2={d(12), . . . , d(23)}, each having a length of 12. The first sequence d1 is transmitted in the first slot, and the second sequence d2 is transmitted in the second slot. In FIG. 5, the first sequence d1 is transmitted in the first slot.

The symbol sequence is spread with an orthogonal sequence wi. Symbol sequences are mapped to respective data OFDM symbols. An orthogonal sequence is used to identify a PUCCH (or UE) by spreading the symbol sequence across the data OFDM symbols.

The orthogonal sequence has a spreading factor K=5, and includes five elements. As the orthogonal sequence, one of five orthogonal sequences of Table 4 below can be selected in accordance with an orthogonal sequence index i.

TABLE 4

| Index (i) | $[w_i(0), w_i(1), w_i(2), w_i(3), w_i(4)]$ |
| --- | --- |
| 0 | $[+1, +1, +1, +1, +1]$ |
| 1 | $[+1, e^{j2\pi/5}, e^{j4\pi/5}, e^{j6\pi/5}, e^{j8\pi/5}]$ |
| 2 | $[+1, e^{j4\pi/5}, e^{j8\pi/5}, e^{j2\pi/5}, e^{j6\pi/5}]$ |
| 3 | $[+1, e^{j6\pi/5}, e^{j2\pi/5}, e^{j8\pi/5}, e^{j4\pi/5}]$ |
| 4 | $[+1, e^{j8\pi/5}, e^{j6\pi/5}, e^{j4\pi/5}, e^{j2\pi/5}]$ |

Two slots in the subframe can use different orthogonal sequence indices.

Each spread symbol sequence is cyclically shifted by a cell-specific CS value ncellcs(ns,I). Each cyclically shifted symbol sequence is transmitted by being mapped to a corresponding data OFDM symbol.

ncellcs(ns,I) is a cell-specific parameter determined by a pseudo-random sequence which is initialized on the basis of a physical cell identity (PCI). ncellcs(ns,I) varies depending on a slot number ns in a radio frame and an OFDM symbol number I in a slot.

Two RS OFDM symbols are transmitted by mapping an RS sequence used for demodulation of an ACK/NACK signal.

As described above, since the ACK/NACK signal is spread with an orthogonal sequence having a spreading factor K=5, up to five UEs can be identified by changing an orthogonal sequence index. This implies that up to five PUCCH formats 3 can be multiplexed in the same RB.

Figure 6:
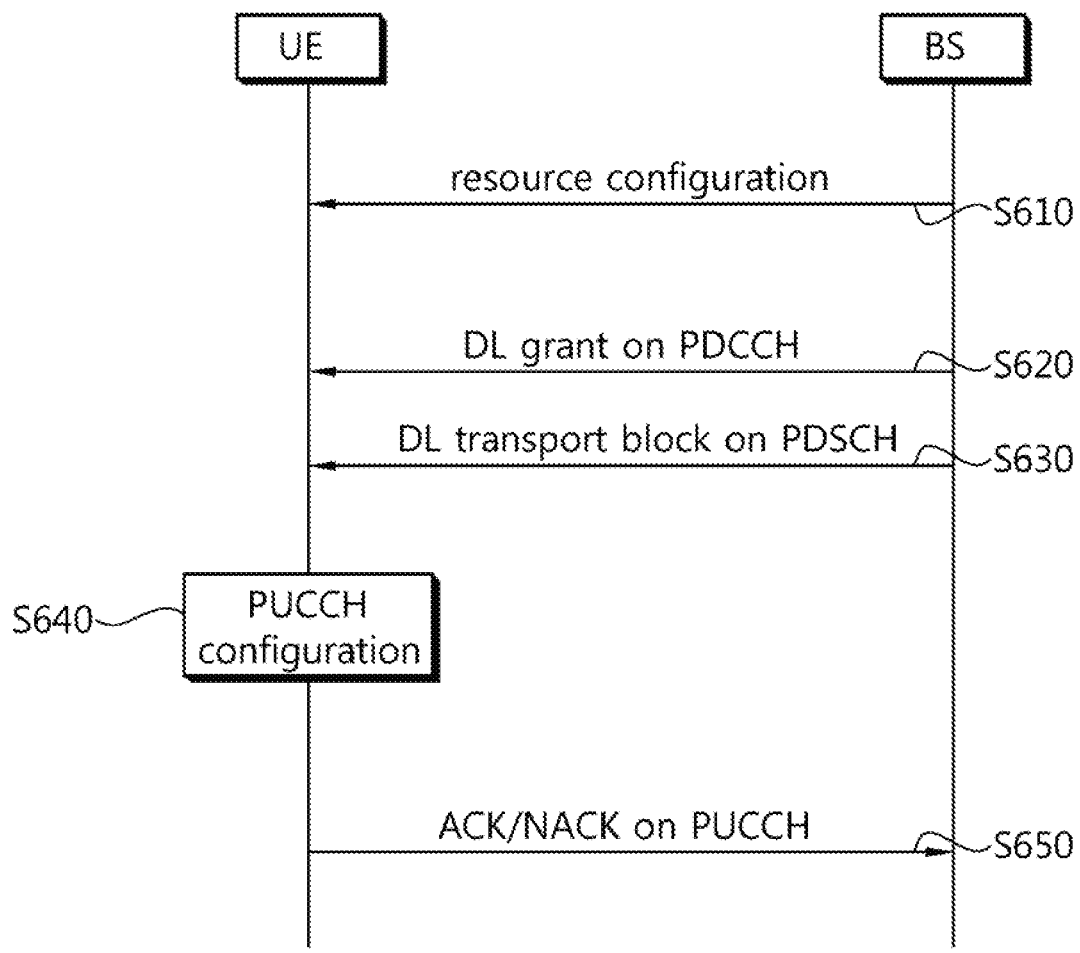
FIG. 6 is a flowchart showing a method of performing hybrid automatic repeat request (HARQ) using a PUCCH format 3.

FIG. 6 is a flowchart showing a method of performing HARQ using a PUCCH format 3.

A BS transmits a resource configuration to a UE (step S610). The resource configuration can be transmitted by using a radio resource control (RRC) message for configuring/modification/reconfiguration of a radio bearer.

The resource configuration includes information regarding a plurality of resource index candidates. The plurality of resource index candidates may be a set of resource indices that can be configured to the UE. The resource configuration may include information regarding four resource index candidates.

The BS transmits a DL grant to the UE through a PDCCH (step S620). The DL grant includes a DL resource allocation and a resource index field. The DL resource allocation includes resource allocation information indicating a PDSCH. The resource index field indicates a resource index nPUCCH used to configure a PUCCH among the plurality of resource index candidates. If there are four resource index candidates, the resource index field may have two bits.

The UE receives a DL transport block through a PDSCH on the basis of the DL resource allocation (step S630). The UE generates an HARQ ACK/NACK signal for the DL transport block.

The UE configures the PUCCH on the basis of a resource index (step S640). In the structure of FIG. 5, a PUCCH resource includes an orthogonal sequence index used to spread the ACK/NACK signal and a CS index for a reference signal.

The orthogonal sequence index used to spread the ACK/NACK signal can be obtained as follows.

$$i_1 = n_{PUCCH} \bmod N_{SF}, \quad i_2 = 3i_1 \bmod N_{SF} \quad \text{[Equation 3]}$$

Herein, i1 is an orthogonal sequence index used in a first slot, i2 is an orthogonal sequence index used in a second slot, NSF is a spreading factor of an orthogonal sequence, and nPUCCH is a resource index.

Since the PUCCH is transmitted in one subframe, that is, in two slots, two orthogonal sequence indices are determined. Since one slot includes five data OFDM symbols, NSF is 5.

A CS index Ics for a reference signal is selected from a CS index set {0, 3, 6, 8, 10}. More specifically, a relationship between the orthogonal sequence index and the CS index Ics can be defined by Table 5 below.

TABLE 5

| $i_1$ or $i_2$ | Ics |
|---|---|
| 0 | 0 |
| 1 | 3 |
| 2 | 6 |
| 3 | 8 |
| 4 | 10 |

That is, the orthogonal sequence index and the CS index can be 1:1 mapped.

A cyclic shift for two RS OFDM symbols is obtained on the basis of the CS index. For example, the UE may determine a first CS index Ics(1)={ncellcs(ns,I)+Ics} mod N with respect to an RS OFDM symbol with I=1, and may determine a second CS index Ics(5)={ncellcs(ns,I)+Ics} mod N with respect to an RS OFDM symbol with I=5.

The UE determines a PUCCH resource on the basis of a resource index nPUCCH, and configures a PUCCH having the same structure of FIG. 5.

The UE transmits an ACK/NACK signal through the PUCCH (step S650).

First Embodiment: ACK/NACK Resource Allocation

As described above, in the PUCCH formats 1/1a/1b, a PUCCH resource is implicitly allocated from a resource of a PDCCH for a DL grant. In the PUCCH format 3, a PUCCH resource is allocated by using a field explicitly indicating a PUCCH resource (such a field is called an ACK/NACK resource indicator (ARI)).

The present invention proposes a method of transmitting an ARI in an LTE-A TDD system as follows.

More specifically, it is proposed a method of transmitting an ARI by using a 2-bit DAI included in a DL grant according to an ACK/NACK transmission method in TDD.

First, the following terms are defined.

Spatial bundling denotes ACK/NACK bundling for codewords per DL CC with respect to each DL subframe per cell. For example, if two codewords are transmitted in each DL subframe, a bundled ACK/NACK is acquired by performing a binary AND operation on ACK/NACK bits for the two codewords.

CC bundling denotes ACK/NACK bundling for all or some serving cells with respect to each DL subframe.

Subframe bundling denotes ACK/NACK bundling for all or some DL subframes with respect to each serving cell.

The ARI may be transmitted by using a DAI field of a PDCCH for scheduling a serving cell which does not participate in another ACK/NACK bundling other than specific ACK/NACK bundling (e.g., spatial bundling).

The DAI field of the PDCCH for scheduling the serving cell which does not participate in the specific ACK/NACK bundling and/or a transmit power control (TPC) field may be used in ARI transmission.

When the PUCCH format 3 is used without performing any ACK/NACK bundling, the DAI field of the PDCCH can be used as the ARI.

Figure 7:
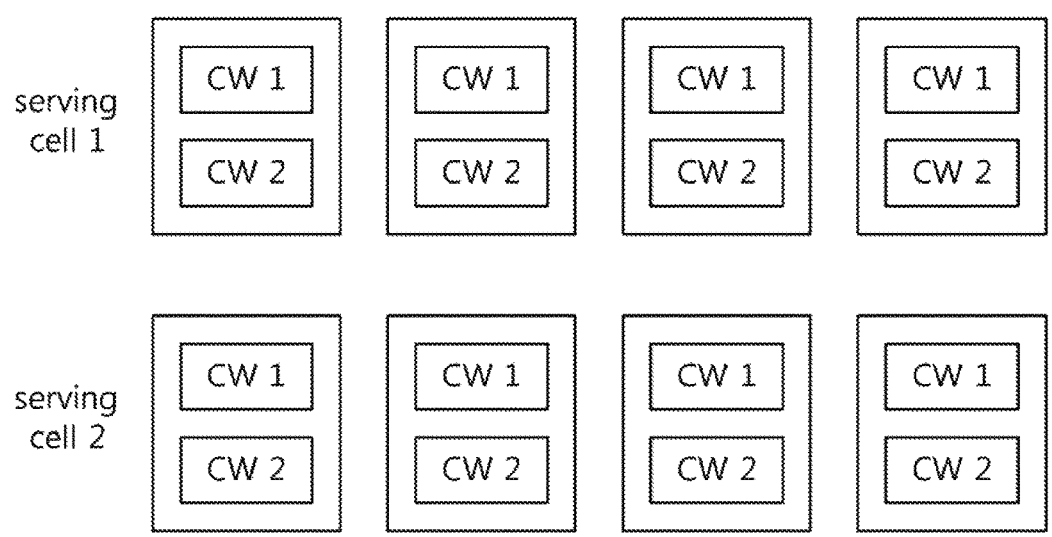
FIG. 7 shows an example of positive-acknowledgement (ACK)/negative-acknowledgement (NACK) transmission.

FIG. 7 shows an example of ACK/NACK transmission.

Assume that four DL subframes are associated with one UL subframe, and two codewords are transmitted in one DL subframe. Since one ACK/NACK bit is required per one codeword, a 16-bit ACK/NACK signal is generated. Therefore, without having to perform specific ACK/NACK bundling, a UE can change the 16-bit ACK/NACK signal into a 48-bit encoded ACK/NACK signal and transmit it by using the PUCCH format 3. In this case, since a DAI in a DL grant is not necessary, a DAI field can be used as an ARI.

Assume that spatial bundling is applied. Since one ACK/NACK bit is required per two codewords, an 8-bit ACK/NACK signal is generated. Without having to perform specific ACK/NACK bundling, a UE can change the 8-bit ACK/NACK signal into a 48-bit encoded ACK/NACK signal and transmit it by using the PUCCH format 3. In this case, since a DAI in a DL grant is not necessary, a DAI field can be used as an ARI.

Figure 8:
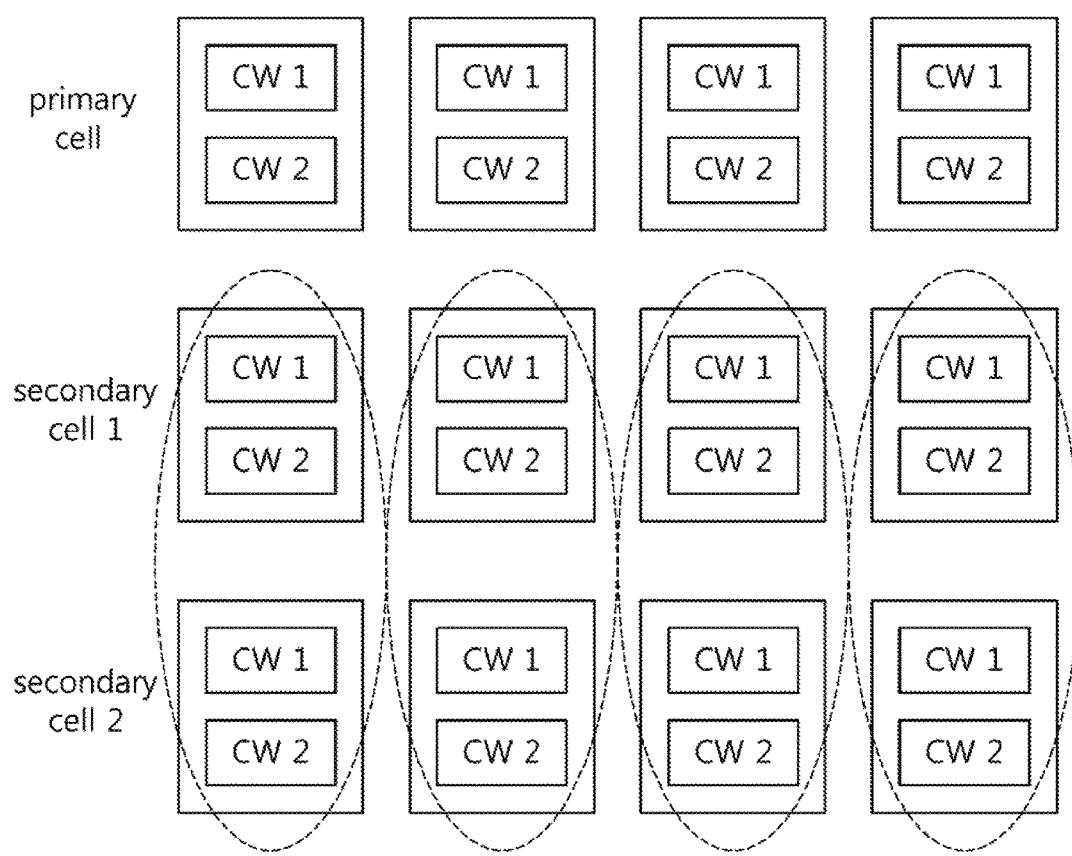
FIG. 8 shows another example of ACK/NACK transmission.

FIG. 8 shows another example of ACK/NACK transmission.

Assume that there is a primary cell and two secondary cells. Also, assume that no bundling is performed in the primary cell, and CC bundling is performed in the secondary cell. Therefore, a 12-bit ACK/NACK signal is generated. A UE can change the 12-bit ACK/NACK signal into a 48-bit encoded ACK/NACK signal and transmit it by using the PUCCH format 3.

Since no bundling is performed in the primary cell, a DAI is not necessary. However, since inter-cell bundling is performed in the secondary cell, a DAI regarding the total number of PDCCHs to be bundled is necessary.

Therefore, a DAI field of a PDCCH for scheduling the primary cell can be used as an ARI, and a DAI of a PDCCH for scheduling the secondary cell can be maintained. In this case, a TPC of the PDCCH for scheduling the secondary cell can be used as the ARI.

Likewise, even if spatial bundling is performed in the primary cell, the DAI is not necessary. Therefore, a DAI field of a PDCCH for scheduling the primary cell can be used as an ARI, and a DAI of a PDCCH for scheduling the secondary cell can be maintained. In this case, a TPC of the PDCCH for scheduling the secondary cell can be used as the ARI.

Second Embodiment: Configuration of ACK/NACK Information

As described above, LTE-A TDD requires transmission of ACK/NACK for a plurality of subframes and a plurality of serving cells.

When generating ACK/NACK for the plurality of serving cells, there is a need to consider that a cell configuration may be mismatched between a UE and a BS.

An RRC message is used to add/modify/release the serving cell. However, since HARQ is performed in a physical layer, the serving cell may be mismatched at a time of sending the RRC message from the BS to the UE and at a time of performing HARQ. This is caused by an ambiguity of time required when the RRC message is transmitted to the UE and the UE actually applies the message. For example, although the BS instructs to add a secondary cell by using the RRC message and then performs scheduling on the secondary cell, the UE may still not be able to recognize the added secondary cell.

Figure 9A:
FIGS. 9a through 9c show a configuration of ACK/NACK information according to an embodiment of the present invention.
Figure 9B:
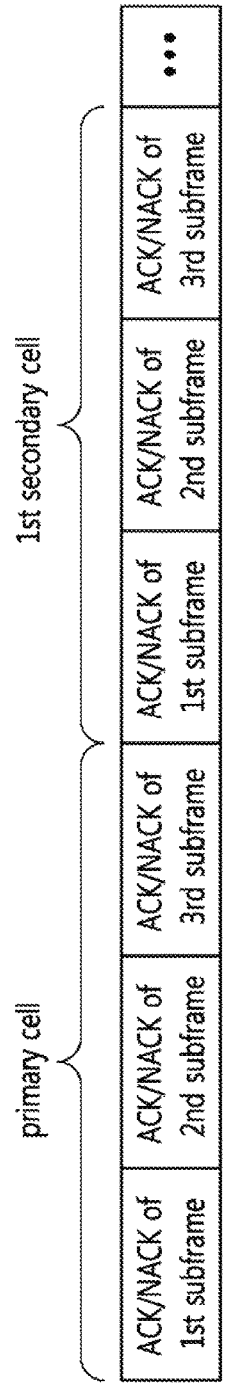
Figure 9C:
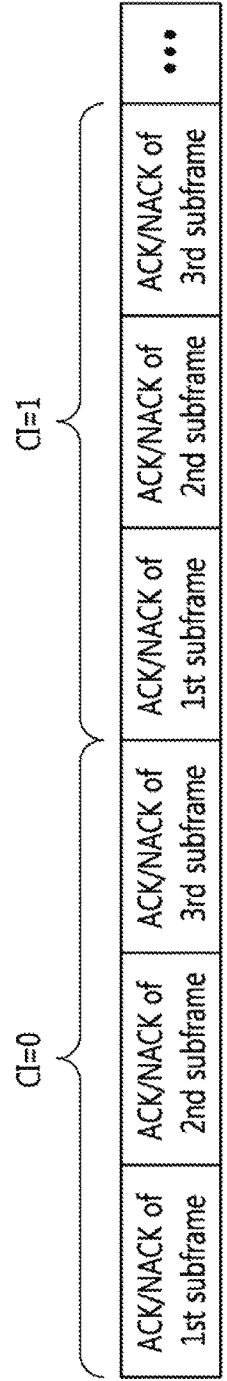

FIGS. 9a through 9c show a configuration of ACK/NACK information according to an embodiment of the present invention.

FIG. 9a shows an example of configuring ACK/NACK information according to a cell priority. Assume that a priority of a primary cell (or a cell having a lowest cell index) is a highest priority. In this example, ACK/NACK bits of the primary cell are first arranged and then ACK/NACK bits of a secondary cell are arranged.

FIG. 9b shows an example of configuring ACK/NACK information according to a cell priority when a plurality of DL subframes are associated. Although it is shown that three subframes are present per cell for example, the number of subframes is not limited thereto.

If a plurality of codewords are transmitted per subframe, the ACK/NACK bits may be bundled or may be not bundled.

FIG. 9c shows an example of configuring ACK/NACK information in an ascending order of a CI. In this example, ACK/NACK bits of a cell having a lowest CI are first arranged, and then ACK/NACK bits of a cell having a next CI are arranged.

When the ACK/NACK bits are arranged in an order designated for each cell, even if a mismatch occurs in a cell configuration, there is no change in an ACK/NACK bit position of the primary cell or a cell having the highest priority. Therefore, a case of incorrectly performing HARQ can be prevented.

Figure 10:
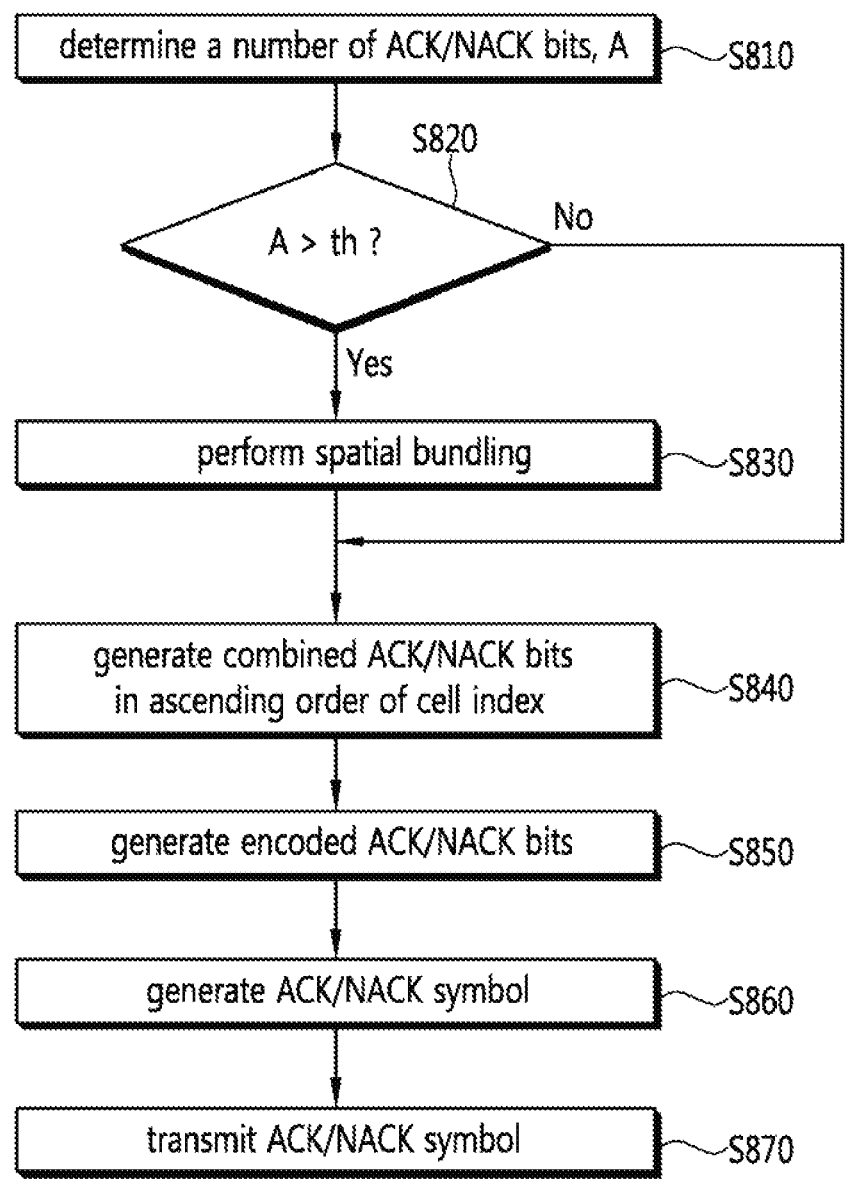
FIG. 10 is a flowchart showing a method of transmitting a reception acknowledgement according to an embodiment of the present invention.

FIG. 10 is a flowchart showing a method of transmitting a reception acknowledgement according to an embodiment of the present invention. This method can be performed by a UE. A 1-bit ACK/NACK is a reception acknowledgement for a DL codeword. A positive acknowledgement may be encoded to '1' and a negative acknowledgement may be encoded to '0'. However, an encoding scheme of the ACK/NACK information is not limited thereto.

The UE determines the number A of ACK/NACK bits for a plurality of serving cells and a plurality of DL subframes (step S810). It is assumed that the number of serving cells is denoted by Ncell, the number of DL subframes in a serving cell c is denoted by Bc, and the number of codewords in the serving cell c is denoted by Cc.

$$A = \sum_{c=0}^{N_{cell}-1} B_c C_c \quad \text{[Equation 4]}$$

The ACK/NACK bits for the plurality of serving cells and the plurality or DL subframes can be expressed by a bit sequence {a0, a1, . . . , aA-1}. For example, in case of single-codeword transmission, a 1-bit ACK/NACK (i.e., ak) is used for the cell c. In case of 2-codeword transmission, a 2-bit ACK/NACK (i.e., ak and ak+1) is used for the cell c. Herein, ak denotes a 1-bit ACK/NACK for a first codeword, and ak+1 denotes a 1-bit ACK/NACK for a second codeword.

The UE determines whether the number A of ACK/NACK bits is greater than a specific threshold 'th' (step S820). This step is for determining whether to perform spatial bundling to adjust the number of the ACK/NACK bits according to capacity of a UL channel. For example, the specific threshold 'th' may be 20. If there is no need to determine whether to perform the spatial bundling, this step can be skipped.

The UE performs the spatial bundling if the number A of ACK/NACK bits is greater than the specific threshold 'th' (step S830). The spatial bundling in which a binary AND operation of ACK/NACK bits corresponding to at least two codewords in each subframe is performed for all subframes in all serving cells. If a 2-bit ACK/NACK (i.e., ak and ak+1) exists for two codewords in a subframe, it is replaced to a 1-bit ACK/NACK (i.e., ak') by performing the binary AND operation.

The UE generates a combined ACK/NACK bit by arranging (bundled) ACK/NACK bits in an ascending order of a cell index in a plurality of serving cells (step S840). It is assumed that a CI starts from 0. That is, a lowest CI may be 0, and a cell having the lowest CI may be a primary cell.

For example, it is assumed that a bit sequence is {a0, a1, . . . , aA-1}, 1-codeword transmission is performed, four cells are present, and three DL subframes exist per cell. Therefore, A=12. It is assumed that aki,s is a 1-bit ACK/NACK of an s-th subframe (where s=0, 1, 2) of a cell having a CI i (where i=0, 1, 2, 3). A combined ACK/NACK bit is generated such as {a00,0, a10,1, a20,2, a31,0, a41,1, a51,2, a62,0, a72,1, a82,2, a93,0, a103,1, a113,2}.

Since the ACK/NACK bits are arranged in an order designated for each cell, even if a mismatch occurs in a cell configuration, an ACK/NACK bit position of the primary cell does not change at least. Therefore, a case of incorrectly performing HARQ can be prevented in the primary cell.

The UE generates an encoded ACK/NACK bit by encoding the combined ACK/NACK bit (step S850). The reason of encoding the ACK/NACK bit is to adjust the number of bits according capacity of the UL channel. For example, since capacity of the PUCCH format 3 is 48 bits, a 48-bit encoded ACK/NACK bit can be generated by encoding the aforementioned 12-bit combined ACK/NACK bit. An encoding scheme may be various such as repetition, concatenation, block coding, etc. There is no restriction in the encoding scheme.

The UE generates an ACK/NACK symbol by modulating the encoded ACK/NACK bit (step S860). For example, for the PUCCH format 3, a symbol sequence d={d(0), d(1), . . . , d(23)} can be generated by performing QPSK modulation on a 48-bit encoded ACK/NACK bit.

The UE transmits the ACK/NACK symbol to the BS on the UL channel (step S870). The UL channel may use the PUCCH format 3 of FIG. 5. Alternatively, the UL channel may be a PUSCH. If the UL channel is the PUSCH, the encoded ACK/NACK bit may be transmitted by being multiplexed with a UL transport block.

Figure 11:
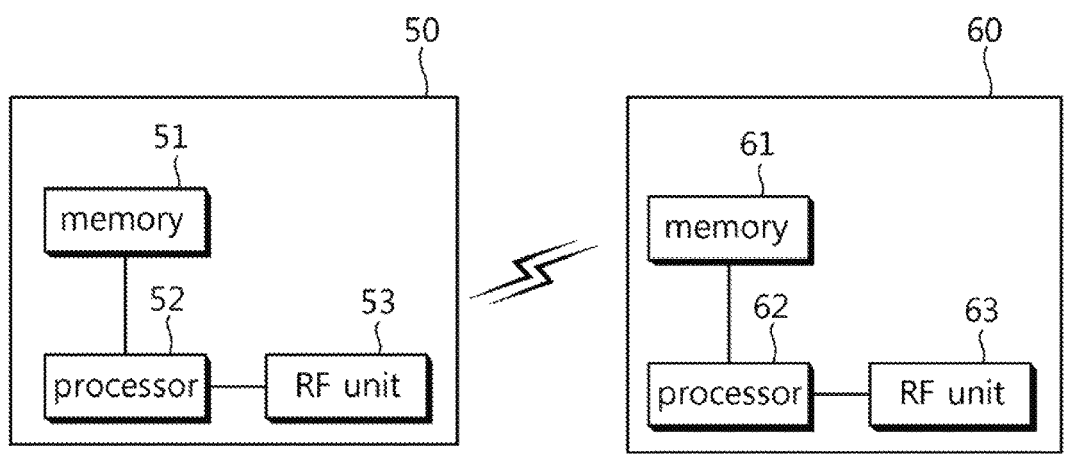
FIG. 11 is a block diagram showing a wireless communication system according to an embodiment of the present invention.

FIG. 11 is a block diagram showing a wireless communication system according to an embodiment of the present invention.

A BS 50 includes a memory 51, a processor 52, and a radio frequency (RF) unit 53. The memory 51 is coupled to the processor 52, and stores a variety of information for driving the processor 52. The RF unit 53 is coupled to the processor 52, and transmits and/or receives a radio signal.

The processor 52 implements the proposed functions, processes, and/or methods. In the aforementioned embodiments, the operation of the BS 50 can be implemented by the processor 52. The processor 52 can manage multiple cells, and can perform HARQ.

The UE 60 includes a memory 61, a processor 62, and an RF unit 63. The memory 61 is coupled to the processor 62, and stores a variety of information for driving the processor 62. The RF unit 63 is coupled to the processor 62, and transmits and/or receives a radio signal. The processor 62 implements the proposed functions, processes, and/or methods. In the aforementioned embodiments, the operation of the UE 60 for transmitting a reception acknowledgement can be implemented by the processor 62.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of transmitting a hybrid automatic repeat request (HARQ) acknowledgement (ACK)/negative-acknowledgement (NACK) in a wireless communication system, the method performed by a user equipment (UE) and comprising:
generating ACK/NACK bits for downlink subframes from a plurality of serving cells;
arranging the ACK/NACK bits in an ascending order of cell indexes of the plurality of serving cells such that the ACK/NACK bits include a series of ACK/NACK bits for downlink subframes of a first cell among the plurality of serving cells and a series of ACK/NACK bits for downlink subframes of a second cell among the plurality of serving cells; and
transmitting the ACK/NACK bits to a base station,
wherein the first cell among the plurality of serving cells has a lowest cell index, and
wherein the second cell among the plurality of serving cells has a next lowest cell index.

2. The method of claim 1, wherein arranging the ACK/NACK bits comprises:
arranging the series of ACK/NACK bits for downlink subframes of the first cell of the plurality of serving cells; and
appending the series of ACK/NACK bits for the downlink subframes of the second cell of the plurality of serving cells at the end of the series of the ACK/NACK bits for the first cell of the plurality of serving cells.

3. The method of claim 2, wherein the lowest cell index is zero.

4. The method of claim 1, further comprising determining whether a number of the ACK/NACK bits for the plurality of serving cells is greater than a specific value.

5. The method of claim 4, further comprising applying spatial bundling to all downlink subframes in all serving cells if the number of ACK/NACK bits is greater than the specific value.

6. The method of claim 1, wherein the wireless communication system is a time division duplex system.

7. The method of claim 1, wherein generating the ACK/NACK bits comprises:
encoding the ACK/NACK bits; and
generating ACK/NACK symbols by modulating the encoded ACK/NACK bits.

8. The method of claim 7, wherein a number of the encoded ACK/NACK bits is 48.

9. The method of claim 7, further comprising modulating the encoded ACK/NACK bits by using quadrature phase shift keying (QPSK).

10. The method of claim 7, wherein transmitting the ACK/NACK bits comprises:
spreading the ACK/NACK symbols with orthogonal sequences; and
transmitting the spread ACK/NACK symbols.

11. A user equipment (UE) configured for transmitting a hybrid automatic repeat request (HARQ) acknowledgement (ACK)/negative-acknowledgement (NACK) in a wireless communication system, the UE comprising:
a radio frequency unit configured to transmit a radio signal; and
a processor operatively coupled with the radio frequency unit and configured to:
generate ACK/NACK bits for downlink subframes from a plurality of serving cells;
arrange the ACK/NACK bits in an ascending order of cell indexes of the plurality of serving cells such that the ACK/NACK bits include a series of ACK/NACK bits for downlink subframes of a first cell among the plurality of serving cells and a series of ACK/NACK bits for downlink subframes of a second cell among the plurality of serving cells; and
control the radio frequency unit to transmit the ACK/NACK bits to a base station,
wherein the first cell among the plurality of serving cells has a lowest cell index, and
wherein the second cell among the plurality of serving cells has a next lowest cell index.

12. The user equipment of claim 11, wherein arranging the ACK/NACK bits comprises:
arranging the series of ACK/NACK bits for the downlink subframes of the first cell of the plurality of cells; and
appending the series of ACK/NACK bits for the downlink subframes of the second cell of the plurality of cells at the end of the series of the ACK/NACK bits for the first cell of the plurality of cells.

13. The user equipment of claim 12, wherein the lowest cell index is zero.

14. The user equipment of claim 11, wherein the processor is further configured to determine whether a number of the ACK/NACK bits for the plurality of serving cells is greater than a specific value.

15. The user equipment of claim 14, wherein the processor is further configured to apply spatial bundling to all downlink subframes in all serving cells if the number of ACK/NACK bits is greater than the specific value.

16. The user equipment of claim 11, wherein generating the ACK/NACK bits comprises:
   encoding the ACK/NACK bits; and
   generating ACK/NACK symbols by modulating the encoded ACK/NACK bits.

17. The user equipment of claim 16, wherein a number of the encoded ACK/NACK bits is 48.

18. The user equipment of claim 17, wherein the processor is further configured to modulate the encoded ACK/NACK bits by using quadrature phase shift keying (QPSK).

19. The user equipment of claim 17, wherein transmitting the ACK/NACK bits comprises:
   spreading the ACK/NACK symbols with orthogonal sequences; and
   controlling the radio frequency unit to transmit the spread ACK/NACK symbols.

* * * * *